March 10, 1936.  A. DAVIS, JR  2,033,457
ROAD TANK VEHICLE
Filed Nov. 14, 1934  3 Sheets-Sheet 1

INVENTOR
Augustine Davis, Jr.
BY J. F. Brandenburg
ATTORNEY

March 10, 1936.                A. DAVIS, JR                    2,033,457
                            ROAD TANK VEHICLE
                            Filed Nov. 14, 1934              3 Sheets-Sheet 2
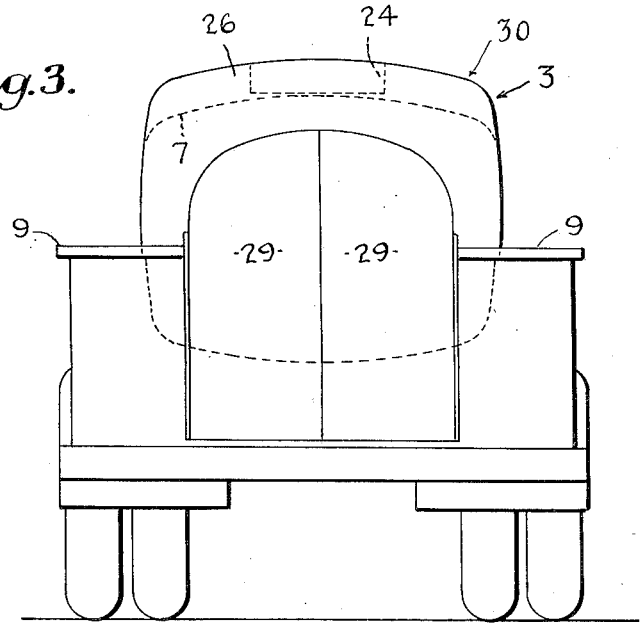
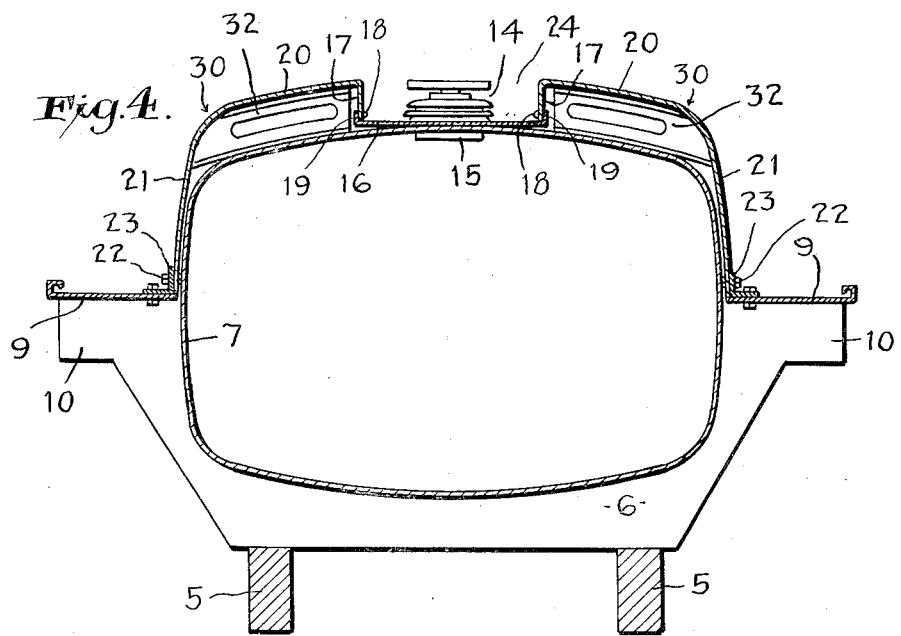
INVENTOR
Augustine Davis, Jr.
BY J. J. Brandenburg
ATTORNEY March 10, 1936.                A. DAVIS, JR                   2,033,457
                              ROAD TANK VEHICLE
                           Filed Nov. 14, 1934              3 Sheets-Sheet 3
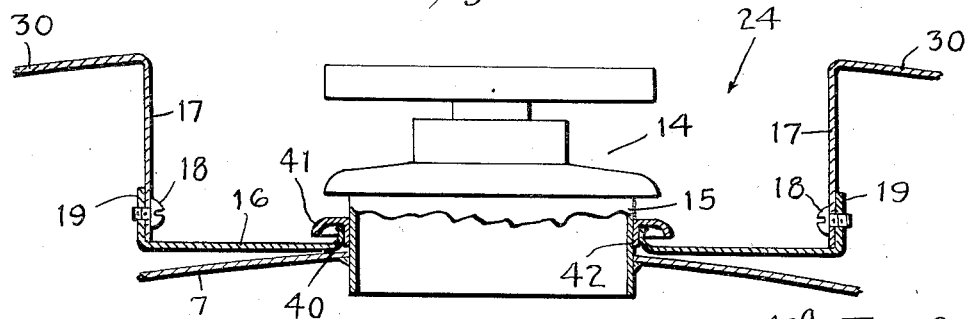
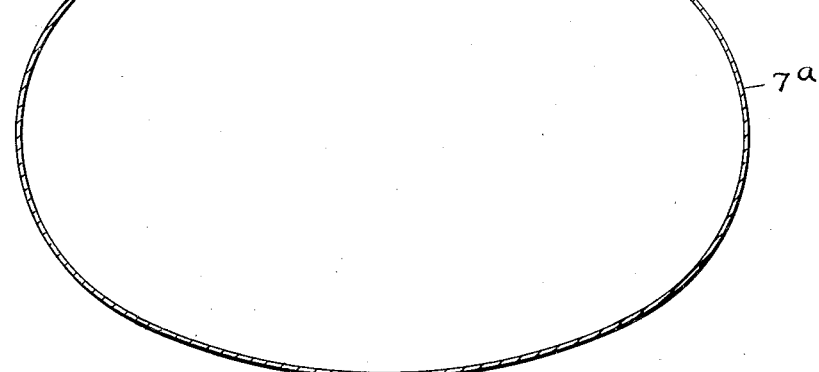
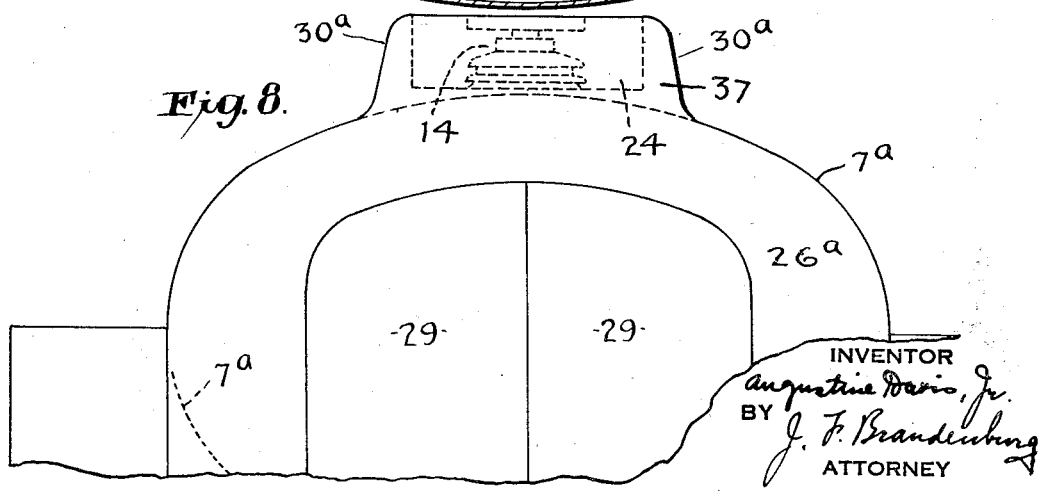
INVENTOR
Augustine Davis, Jr.
BY J. F. Brandenburg
ATTORNEY Patented Mar. 10, 1936

2,033,457

UNITED STATES PATENT OFFICE 2,033,457

ROAD TANK VEHICLE

Augustine Davis, Jr., Cincinnati, Ohio

Application November 14, 1934, Serial No. 752,982

13 Claims. (Cl. 280—5)

This invention relates to road-vehicle tanks and tank vehicles, such as truck tanks and trailer tanks.

An object of the invention is to provide means for streamlining such tanks, or for giving them lines which improve the appearance, and to do this at little extra expense and with little added weight. Reduction of air resistance, which is part of the object of the invention, is accomplished to a greater or less degree depending upon the particular carrying out of the invention.

Another object is to hide or substantially conceal the manholes or filling holes and their covers, which ordinarily project from the tops of these tanks and break the lines. Still another object is, while hiding these parts, and/or other parts such as valve mechanisms, to leave them readily accessible.

A further object of the invention is to furnish the tank with lines which conform more or less substantially with the lines of the cab of the truck or tractor. In one of the illustrated embodiments of the invention, the top of the tank is streamlined with the top of the cab. Another embodiment is adapted to streamline the tank with the sides of the cab, or with both the top and the sides of the cab. Because of required capacities or dimensions of the tank itself, or differences between various styles of cab which may be desired by customers, it may not always be possible to aline the top of the tank body, adapted as herein disclosed, exactly with the top of the cab, or to have the sides of the tank exactly in lines with the sides of the cab, but the constructions which are illustrated and which will be described make it possible to approximate or achieve a streamline effect.

The invention comprises a similar type of shield construction either applied to the top of the tank or extending over the top and down the sides of the tank. In the latter embodiment, a further object is to cover the rough sides of the bare tank and make it easy to secure a fine finish.

Still another object of the invention is to keep liquid caught or spilled in a top depression of the shield, where the manholes or filling holes are hidden, from running down the sides of the tank and streaking it, if the sides of the tank are exposed, or from entering the space between the tank and the shield and possibly forming an explosive mixture therein.

Other objects and features of the invention will become apparent or will be described as the specification proceeds.

In the accompanying drawings, forming part hereof:

Fig. 3 is a rear elevation of the tank truck of Fig. 1;

Fig. 4 is a vertical transverse section through the tank body and the shield of this embodiment of the invention;

Fig. 5 is a fragmentary view, on an enlarged scale, in vertical transverse section, showing portions of the tank and shield and one of the manholes or filling holes with its cover and means to prevent liquid from passing from the depression in the shield, around the manhole and onto the outside of the tank or into the space between the tank and the shield;

Fig. 6 is a sectional view showing, in a smaller fragment, a modification of this feature;

Fig. 7 is a vertical transverse section through a tank illustrating another embodiment of the invention which streamlines the top of the tank; and Fig. 8 is a fragmentary rear elevation of a tank body corresponding to Fig. 7.

Figures 1, 2:
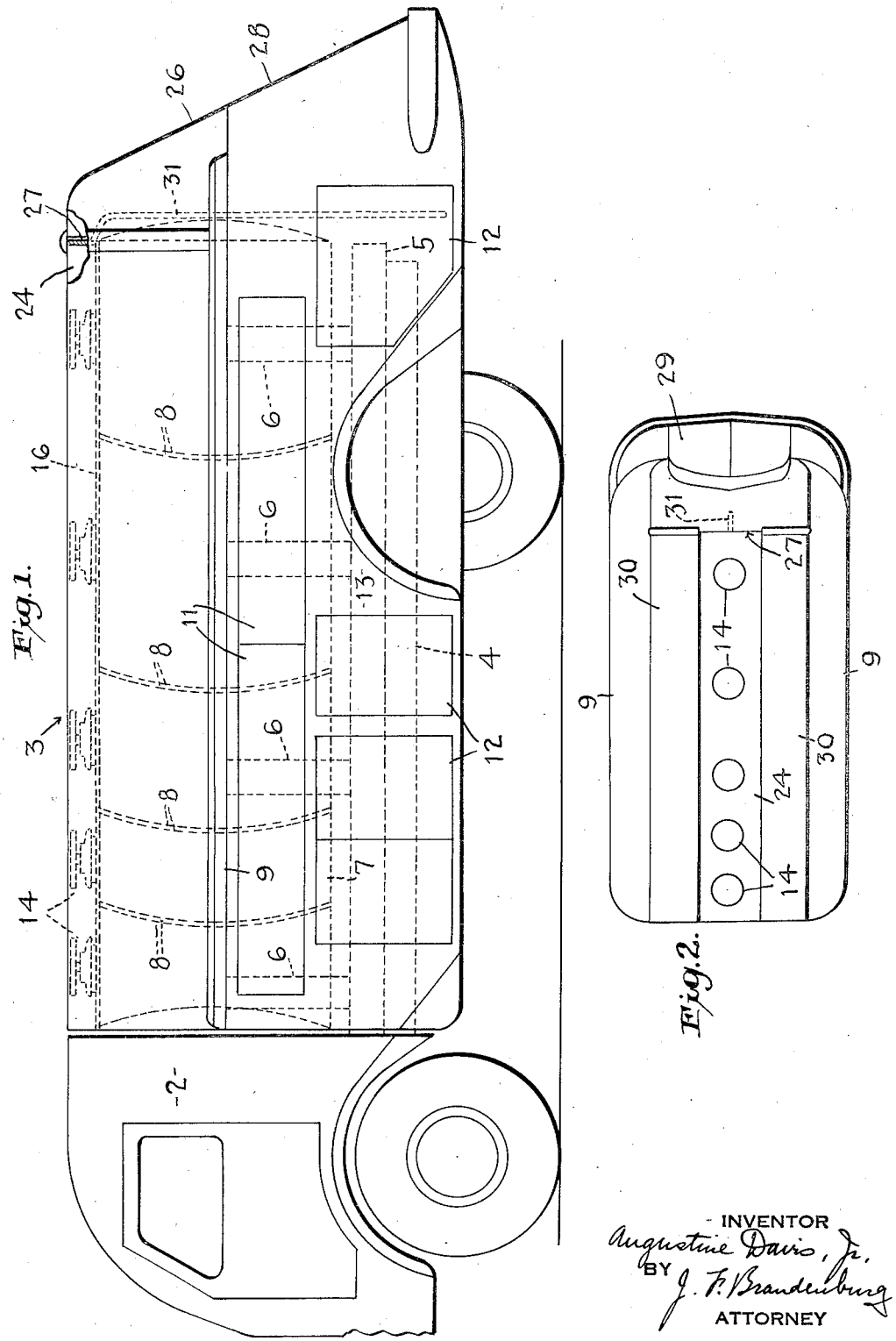
Fig. 1 is a side elevation of a tank truck showing one embodiment of the invention.
Fig. 2 is a plan view, on a smaller scale, of the tank body of Fig. 1.

In Fig. 1, the cab of the tank vehicle is designated with the reference character 2, and the tank body as a whole is marked 3. The cab shown is of a special streamline type, but the invention is applicable in connection with various styles of cabs. The tank body is supported on the chassis sills 4, the tank mounting itself preferably consisting of sills 5 and cradle bolsters 6.

In the form of the invention illustrated in Figs. 1 to 6, the tank 7 is preferably of semi-rectangular cross-section, but the tank may be of elliptical or other section. The tank consists of a number of separate compartments, as indicated by the broken lines 8 in Fig. 1. The tank may be of unit construction or it may consist of separate or separable chambers mounted in line. The term tank as used herein means either a unit tank or a series of separable tank chambers.

Lateral running-boards 9 are secured to extensions 10 of the bolsters 6, these running-boards being located more or less midway of the height of the tank measured from top to bottom. Various compartments and cabinets 11, 12, flush at the outer sides with aprons 13, are supported beneath the running-boards 9 and conceal the lower part of the tank from the sides. For simplicity of illustration these cabinets are omitted in Fig. 4.

Each tank compartment has an opening in its top. This opening may be either a manhole or a filling opening, and is provided with a suitable cover 14, this cover being applied to a frame or ring 15, which is welded in the opening of the tank shell.

A tread-plate or catwalk 16 extends along the top of the tank, at the base of the region where the parts 14 and 15 project above the top of the tank. This tread-plate is provided with openings, which encircle the respective frames 15.

This tread-plate may be considered a part of the shield structure, to be described, or the shield may be said to consist of two shields 30 disposed at opposite sides of the longitudinal area containing the tank openings.

In the type of construction illustrated in Figs. 1 to 5, each of these shields comprises a metal sheet, bent or curved in a special manner. Naturally, however, it may be made up of a number of sheets. Each shield has a substantially vertical inner wall 17, the lower portion of which is connected by screws 18 to an upright flange 19 on the side of the tread-plate 16. From the top of this wall 17 there extends an outer wall or walls 20, 21. The portion 20 of the outer wall of the shield is disposed at a substantial distance above the upper surface of the tank, and extends outward in substantial or approximate conformity with the transverse contour of the upper portion of the cab, whatever it may be. The portion 21 of the outer wall extends downward in proximity to the sides of the tank, and its lower edges are fastened by bolts and nuts 22 to a kick-plate 23, which is bolted to the inner portion of one of the running-boards 9. These portions 21 of the shields also conform as nearly as possible to the transverse contour of the cab.

The top lines of the shield or shields are straight and continuous, and are alined, or approximately alined, with the top lines of the cab.

Within the longitudinal depression 24 formed between the walls 17 and above the tread-plate 16, the parts 14, 15 are hidden from view from the sides of the tank vehicle. The walls 17 are shown slightly higher than the covers 14, but it will be evident that they would be concealed from a point of view lower than the top of the tank body even though they might be slightly higher than the sides of the depression. Indeed, the purpose of the invention would not be entirely defeated if the covers showed somewhat above the top of the tank body.

The manholes and covers are also concealed from view from behind the vehicle by the upper portion of a rear end shell 26, or by a wall 27 closing the rear end of the depression 24. This shell has a sloping back 28 merging at the top with the top lines of the shields 30. Rear doors 29 give access to the interior of such shell or housing, where buckets may be carried.

A cover may easily be provided for the depression 24, if desired. With the depression left open, snow and dirt can be swept out through its open front end. If liquid should tend to collect toward the closed rear end of the depression, a drain pipe 31 may be provided, this pipe extending downward through the rear end shell.

The embodiment of the invention which has been described supplies a way in which truck tanks can be given virtually complete streamlining at moderate expense and with only slight additional dead weight. The tank, and any fastening or securing means for the tank, are jacketed, and the shields are admirably adapted for external finish. By virtue of the detachable connections, the shields 30, and also the tread-plate 16, can be removed if the tank requires attention, or if it should be necessary to remove one of the compartments of a separable compartment tank. The rear end shell 26 remains in place when the shield is removed. The upper portions of the shield sheets 20, 21 may be supported at intervals from the tank by light members 32 secured to either the tank or the shield.

Figs. 7 and 8 illustrate a still simpler construction, which gives a partial streamline effect, and which obscures the manholes and covers from the sides and rear. In this embodiment of the invention the shields 30$^a$ do not come down over the sides of the tank 7$^a$, but are of such height that they carry rearward the top lines of the cab (which is not shown in these views). The tread-plate or catwalk 16 is the same as in the other construction, and each of the shields has a vertical inner wall 17, which is connected by screws 18 to the inside of an upturned flange 19 of the tread-plate. At the top of the wall 18, each shield is bent over and an outer wall 20$^a$ slopes downward and outward to the upper side of the tank, where its lower edge is detachably fastened, by screws 35, to angle pieces 36 spot-welded to the tank. This shield construction is, also, removable.

In this particular form of the invention, the rear end shell 26$^a$ conforms to the contour and lines of the exposed upper portion of the tank, and has an extension 37, which conforms to the outer lines of the shield structure at the top of the tank and extends across the rear end of such structure. As in the other embodiment of the invention, the parts 14, 15 are screened from view both from the side and from the back.

Attention is now called to Figs. 5 and 6. As previously stated, the plate 16 has openings for the manhole or filling hole frames 15 which project from the top of the tank. At the edge of each of the openings in the plate, there is an upturned flange 40, which extends all the way around the frame 15. The function of this flange is to keep water, or gasoline spilled during filling, from passing downward through the opening in the plate and around the manhole or filling hole, and passing outward under the shield, over the surface of the tank.

In a construction such as that shown in Figs. 7 and 8, if liquid could escape in this manner, carrying with it dirt accumulated in the depression 24, the paint on the exposed sides of the tank would become streaked. It would be troublesome to make a tight joint between the walls 20$^a$ of the shield and the tank, nor would it be desirable to do so, since liquid might then be trapped between the shield and the tank. In the construction shown in Figs. 1–5, dirty liquid trickling over the outside of the tank would not affect the finish, since the finish is on the outside of the jacket shields 30, but fumes of gasoline accumulating in the space between the tank and shields might produce an explosive mixture.

The flanged openings in the plate 16 may be made a close fit for the frames 15, but further protection may be secured by providing the frames with external shedding flanges 41 which overhang and extend beyond the flanges 40.

The flanges 41 may be formed on thimbles or rings, the collars 42 of which fit closely around the frames, between the same and the flanges 40. These thimbles can be removed from the frames when the plate 16 is to be removed. The flanges 41 are not absolutely necessary in this construction, since the flanges 40 by themselves will trap almost all of the water or gasoline that may enter the depression 24 and prevent it from going down around the manholes. In addition, the bent flanges 40 may be made to hug the frames 15.

Fig. 6 illustrates a construction for obtaining a perfectly liquid-tight joint between the plate 16 and the frames 15. In this modification, a flange 40ᵃ is afforded by a separate ring 45 which extends around the frame 15 and is secured to the plate 16 by bolt fastenings 46. An annular gasket 47 is squeezed between the flange and the frame, and is secured between the ring 45 and the plate 16. With this construction, the opening 48 in the plate may be large, and no close fitting of the plate to the manhole frames need be attempted.

The vertical flanges 19 at the sides of the plate 16 serve to retain any liquid that might otherwise pass outward from the plate onto the tank or into the space between the tank and the shield. Since no depth of liquid is apt to remain standing in the depression 24, it is not necessary to make other provision for rendering the joints between the walls 17 and the plate 16 liquid-tight. The connection between the wall 27 at the rear end of the depression and the plate 16 is preferably of a similar nature.

From the foregoing it will be perceived that the invention provides shields which improve the lines of a truck or trailer tank, and screen the manholes or filling holes or the top projections which ordinarily break the lines of such tanks, that in one form of the invention a streamline shielding makes it easy to give the tank body a superior external finish and appearance, that the construction is such that a depression, trough, basin, or cavity having a bottom and sides, is formed within the shielding above the top of the tank, where the projecting parts are located, and that means are provided to prevent, or substantially prevent, liquid from passing from this cavity over the top and sides of the tank or between the tank and the shield.

I claim:

1. A tank vehicle having a cab and a tank-body, said tank-body comprising a tank having a series of openings in the top and parts associated with said openings and projecting upward from the tank, and hollow shields disposed along the tank and extending above it at both sides of a longitudinal area which includes said openings, so that a longitudinal depression is formed between said shields and above the top of the tank, in which depression said parts are concealed from view from the sides of the tank vehicle, said shields being substantially in top alinement with the cab.

2. A tank vehicle having a cab and a tank-body, said tank-body comprising a tank having a series of openings in the top and parts associated with said openings and projecting upward from the tank, hollow shields disposed along the tank and extending above it at both sides of a longitudinal area which includes said openings, so that a longitudinal depression is formed between said shields and above the top of the tank, in which depression said parts are concealed from view from the sides of the tank vehicle and from the rear, the rear end of said depression being closed, and a rear end shell extending beyond the tank and formed in streamline relation to said shields, which in turn are substantially in top alinement with the cab.

3. A road-vehicle tank-body, comprising a tank having a series of openings in the top and parts associated with said openings and projecting upward from the tank, and shields which have walls that rise above the tank at both sides of a longitudinal area containing said openings, and walls that extend outward from the aforesaid walls over the lateral portions of the top of the tank and thence downward so as to cover the sides of the tank which would otherwise be exposed, the construction of the shields being such as to streamline the upper part of the tank and to form a longitudinal depression above the top of the tank, this depression serving to hide said parts and make the same readily accessible.

4. A road-vehicle tank, having a series of openings in the top and parts associated with said openings and projecting upward from the tank, a tread-plate extending along the top of the tank and having openings for said parts, and shields extending above the tank and forming with the tread-plate a longitudinal depression in which said parts are substantially hidden, said shields having inner and outer walls, and the inner walls being connected to said tread-plate.

5. A road-vehicle tank, having a series of openings in the top and parts associated with said openings and projecting upward from the tank, a tread-plate extending along the top of the tank and having openings for said parts, and shields extending above the tank and forming with the tread-plate a longitudinal depression in which said parts are substantially hidden, said shields having inner and outer walls, the inner walls being connected to said tread-plate, and the outer walls extending outward at a substantial distance above the tank and then downward in proximity to the sides of the tank.

6. A road-vehicle tank, having a series of openings in the top and parts associated with said openings and projecting upward from the tank, a tread-plate extending along the top of the tank and having openings for said parts, shields extending above the tank and forming with the tread-plate a longitudinal depression in which said parts are substantially hidden, said shields having inner and outer walls, the inner walls being connected to said tread-plate, and the outer walls extending outward at a substantial distance above the tank and then downward in proximity to the sides of the tank, and means separate from the tank to which the lower portions of said outer walls are detachably fastened.

7. A road-vehicle tank, having a series of openings in the top and parts associated with said openings and projecting upward from the tank, a tread-plate extending along the top of the tank and having openings for said parts, shields extending above the tank and forming with the tread-plate a longitudinal depression in which said parts are substantially hidden, said shields having inner and outer walls, the inner walls being connected to said tread-plate, and the outer walls extending outward at a substantial distance above the tank and then downward in proximity to the sides of the tank, and means for preventing liquid escaping from said depression into the spaces between the shields and the tank.

8. A road-vehicle tank, having a series of openings in the top and parts associated with said openings and projecting upward from the tank, a tread-plate extending along the top of the tank and having openings for said parts, and shields extending above the tank and forming with the tread-plate a longitudinal depression in which said parts are substantially hidden, said shields having inner and outer walls, the inner walls being connected to said tread-plate, and the outer walls being connected to the tank.

9. A road-vehicle tank, having a series of openings in the top and parts associated with said openings and projecting upward from the tank, a tread-plate extending along the top of the tank and having openings for said parts, and shields extending above the tank and forming with the tread-plate a longitudinal depression in which said parts are substantially hidden, said shields having inner and outer walls, the inner of which are connected to the tread-plate, and pieces secured to the tank and to which said outer walls are connected.

10. A road-vehicle tank-body, comprising a tank having a series of openings in the top and parts associated with said openings and projecting above the tank, and shields having inner walls extending upward at opposite sides of said parts and outer walls which extend outward at a substantial distance above the tank and then downward in proximity to the sides of the tank, running-boards supported at the sides of the tank, and means connecting the lower portions of said outer walls to said running-boards.

11. In combination with a vehicle tank having an opening in the top thereof and a frame extending upward around the opening, a tread-plate having an opening for said frame, shields connected to said tread-plate and forming therewith a depression above the top of the tank, and a flange on, and around the opening of, the tread-plate to keep liquid from escaping and flowing over the sides of the tank.

12. In combination with a vehicle tank having an opening in the top thereof and a frame extending upward around the opening, a tread-plate having an opening for said frame, shields connected to said tread-plate and forming therewith a depression above the top of the tank, a flange on, and around the opening of the tread-plate, and a flange on said frame overhanging the flange of the tread-plate.

13. In combination with a vehicle tank having an opening in the top thereof and a frame extending upward around the opening, a tread-plate having an opening for said frame, shields connected to said tread-plate and forming therewith a depression above the top of the tank, a flange secured to the tread-plate around the opening therein, and sealing means interposed between said flange and frame.

AUGUSTINE DAVIS, Jr.